July 1, 1924.

J. W. WEISIGER

GAUGE

Filed Dec. 19, 1921   3 Sheets-Sheet 1

1,499,958

Inventor
J.W. Weisiger
By
Attorney

July 1, 1924.

J. W. WEISIGER

GAUGE

Filed Dec. 19, 1921    3 Sheets-Sheet 2

1,499,958

Inventor
J. W. Weisiger
By
Attorney

July 1, 1924.
J. W. WEISIGER
GAUGE
Filed Dec. 19, 1921
1,499,958
3 Sheets-Sheet 3
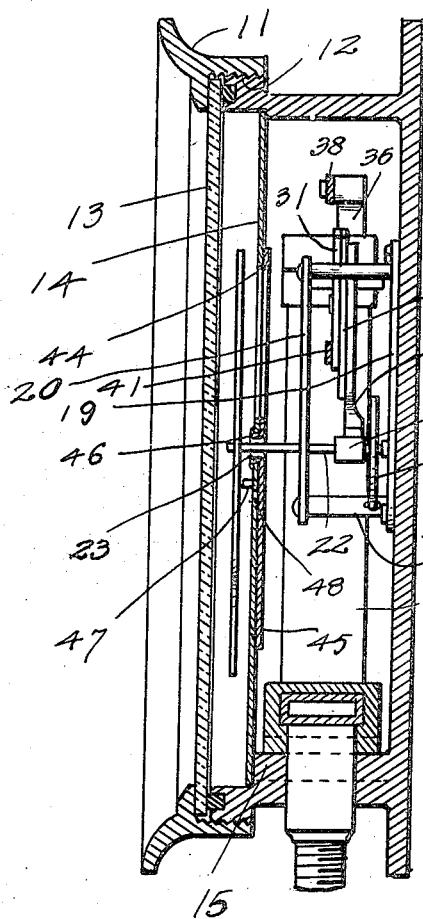
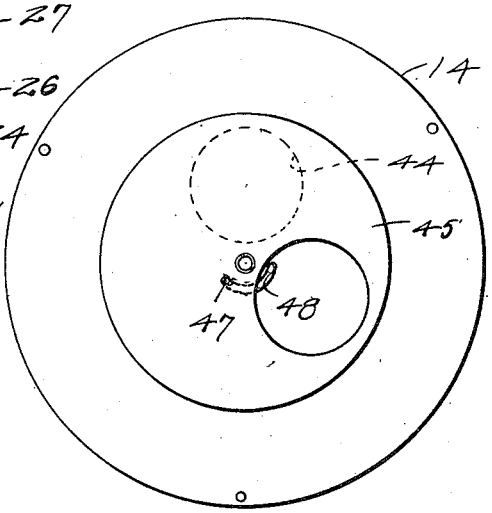
Inventor
J.W.Weisiger
By
Attorney Patented July 1, 1924.

1,499,958

UNITED STATES PATENT OFFICE.

JESSE W. WEISIGER, OF ROCKY MOUNT, NORTH CAROLINA.

GAUGE.

Application filed December 19, 1921. Serial No. 523,510.

*To all whom it may concern:*

Be it known that I, JESSE W. WEISIGER, a citizen of the United States, residing at Rocky Mount, in the county of Edgecombe and State of North Carolina, have invented certain new and useful Improvements in Gauges; and I do hereby declare the following to be a full, clear, and exact description of the invention, such as will enable others skilled in the art to which it appertains to make and use the same.

This invention relates to a gauge or meter and particularly to a correcting or justifying means for the indicating mechanism thereof.

An important object is to provide a means whereby the indicating mechanism of a gauge may be adjusted while the dial is in place so as to overcome the necessity of removing it and associated or other parts, and which in actual practice requires the services of a skilled mechanic and detachment of the gauge and work thereon in a repair shop.

Another object is to provide a simple and efficient correcting or justifying mechanism which may be operated by the lay or unskilled mechanic and while the gauge remains in its original position, to enable the observer of the gauge to himself make adjustment or correction while the instrument is in place.

Still another object is to provide a gauge having an opening through its dial to permit visual inspection of the correcting or justifying means therethrough.

A further object is to provide said correcting or justifying mechanism with a slide adjustable to vary the leverage required to move the gauge indicator which slide may carry a pointer to cooperate with a calibrated plate substantially on a line radial with respect to the teeth of an operating segment for the indicator-actuating spindle.

A still further object is to improve and simplify the construction disclosed in my pending application for a pressure gauge, Serial No. 439,713, filed January 25, 1921.

Additional objects and advantages will appear from a consideration of the description following taken in connection with accompanying drawings illustrating one practical embodiment.

In said drawings:—

Figure 3 is a vertical sectional view through the improved gauge taken on line 3—3 of Figure 1 and in advance of the correcting and justifying mechanism;

Figure 7 is a rear elevation of the dial with the shutter in closed position.

The reference characters designate like or similar parts throughout the different views.

Figure 1:
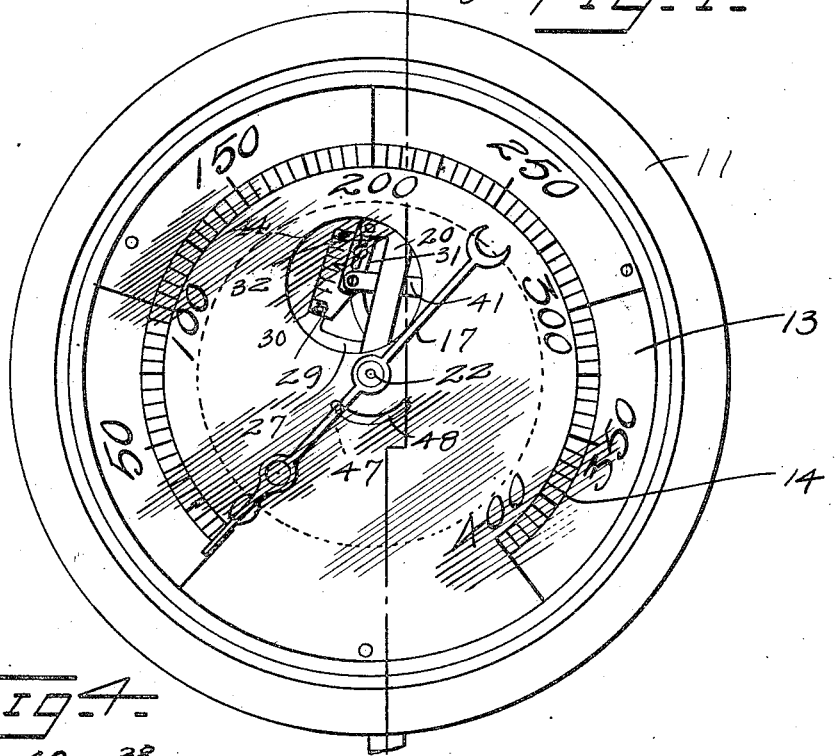
Figure 1 is a front elevation of the improved gauge.
Figure 4:
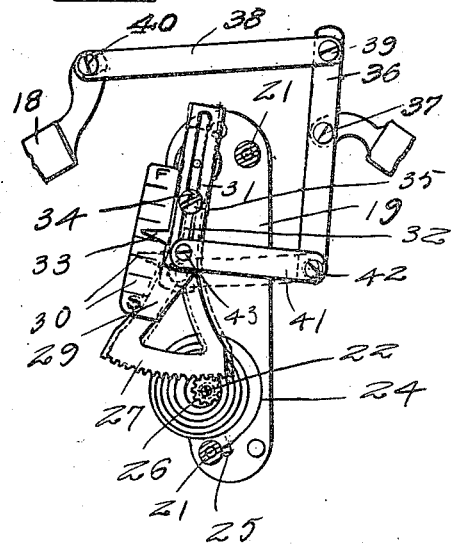
Figure 4 is an enlarged elevation of the justifying mechanism with the mounting frame thereof broken away to disclose details and with a second or adjusted position of the mechanism suggested in dotted lines.
Figure 5:
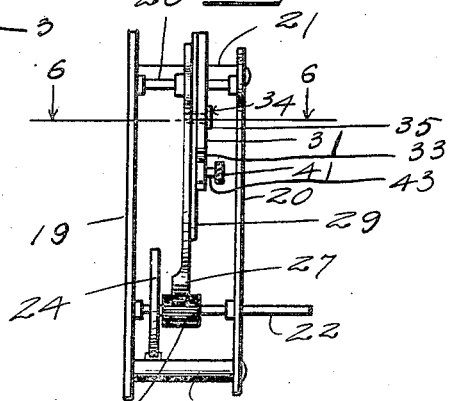
Figure 5 is an enlarged side elevation of the justifying mechanism taken from the opposite sides to that illustrated in Figure 3.

In the example illustrated, a pressure gauge is shown having a casing 10 to which a closure rim 11 is fitted by screw threads at 12 and which rim may carry a lens at 13. Beneath said removable rim 11, the usual calibrated dial 14 is removably disposed, resting on bosses 15 and secured in place by set screws 16 passing through said dial 14 and into the bosses 15. An indicator or pointer is provided at 17 for movement on a horizontal axis over said dial 14 to cooperate with the calibrations thereon in the usual manner. An expansion element 18 is disposed within the casing and in the example shown is of vermi-form. As usual, the pointer or indicator 17 is actuated through contraction and expansion of the element 18.

In the casing a mounting or supporting frame is provided which may consist of a back plate 19 secured to the rear wall of the casing and a front plate 20 spaced from and secured to the back plate by suitable means at 21. The actuating spindle for the pointer or indicator 17 is shown at 22 and is journaled in said plates 19 and 20 and passes loosely through an opening 23 at the center of the dial. Said pointer or indicator 17 is rigidly connected to the spindle 22 in any desired manner.

Figure 2:
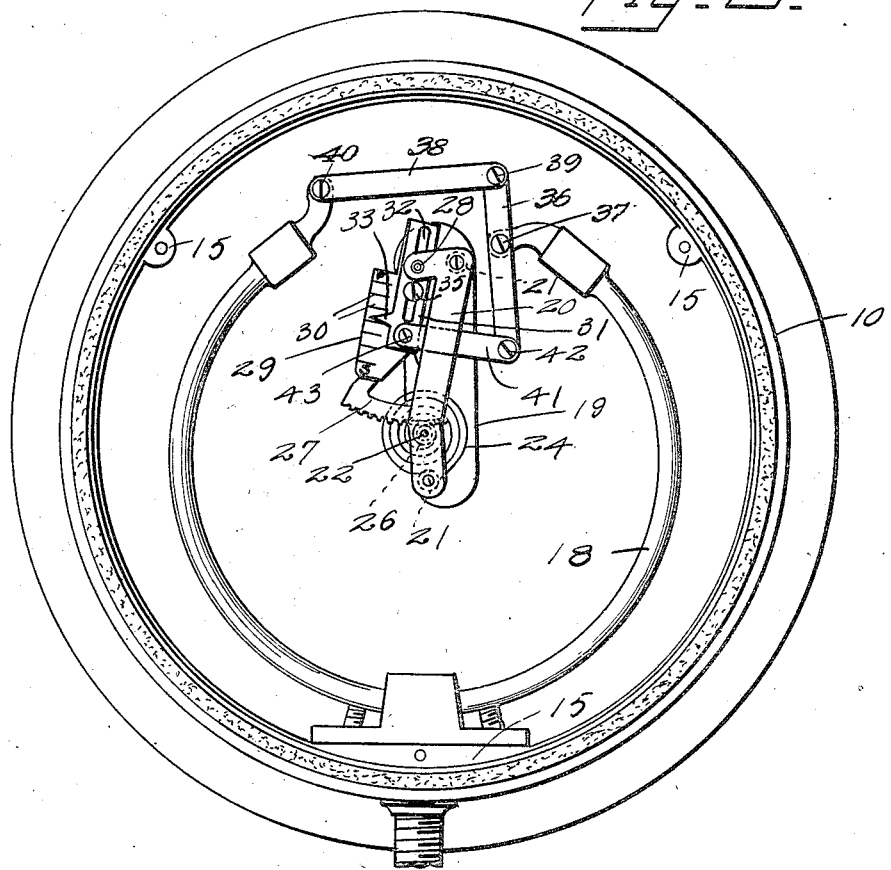
Figure 2 is a front elevation of said gauge with the dial removed.
Figure 6:
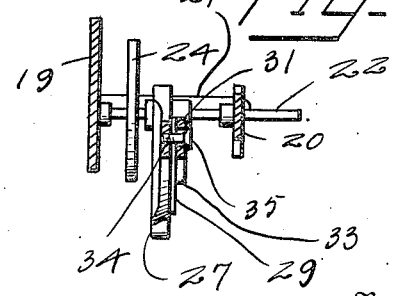
Figure 6 is a cross sectional view on line 6—6 of Figure 5 taken through the elongated slot of the leverage-varying slide.

Associated with the spindle 22 is a return hair spring 24 having one end secured to spindle 22 and its other end to the supporting frame as at 25. A pinion or gear wheel 26 is keyed or otherwise fixed to spindle 22 and meshing therewith is a toothed segment 27 pivotally mounted in the frame in any suitable manner, as by means of a rod 28 Fig. 2 with which it is rigid, journaled in the plates 19 and 20.

Disposed against the segment 27 is a plate 29 having one side edge thereof calibrated as at 30.

Resting on plate 29 and slidably disposed is a slide or plate 31 having an elongated slot 32 extending longitudinally thereof and also having an offset pointer or indicator member 33 cooperating with the calibrations 30. Said rod 28 snugly passes through an opening in the plate 29 and it also passes through the elongated slot 32. An adjustable set screw 34 is threaded into suitable openings in the segment 27 and plate 29 and passes loosely through said elongated slot 32. Set screw 34 has its head 35 overlapping the slide 31 to prevent displacement thereof.

A lever 36 of the first class is pivoted at 37 to one end of the expansion element 18. A link 38 is pivoted to one end of lever 36 at 39 and to the other end of the expansion elements 18 as at 40. Another link 41 is pivoted at 42 to the other end of lever 36 and at 43 to the slide 31.

It will be seen that according to contraction or expansion of the element 18, lever 36 will be shifted which through the medium of the link 41 will swing the segment 27 in order to turn the pinion 27, spindle 22, and accordingly move the pointer or indicator 17 over the dial in cooperation with its calibrations. A spring 24 serves to maintain the pointer and spindle in a normal position and return the same to such a position.

Should the indicator or pointer 17 lose its adjustment at zero, it can be justified or corrected through movement of the slide 31 longitudinally of the segment 27 and the extent of adjustment may be determined by movement of the pointer or indicator 33 with reference to the calibrations 30. In adjusting said slide 31, it is simply necessary to loosen set screw 34, move the slide to the appropriate position and then fasten said set screw 34.

To enable visual inspection of the calibrations 30 and indicator 33, and adjustment of the set screw 34 without removing the dial 14, an opening 44 is provided in said dial. Said justifying mechanism is disposed intermediately in the rear of such openings 44. In order that said opening 44 may be normally closed in order to exclude dust and foreign matter and to present a better appearance, a shutter 45 is provided which is axially movable with and secured to the dial by an eyelet 46. Spindle 22, it will be noted passes through said eyelet 46. To facilitate movement of said shutter 45, a knob or adjusting member 47 is provided which extends through an arcuate slot 48 in the dial and which shutter is limited in its movment through abutment of said knob 47 with the opposite end walls of said slot 48.

By reason of the fact that the dial 14 remains in place while the indicating mechanism is corrected or justified, a supplemental dial, such as 34 as used in the apparatus in said pending application 439,713, may be dispensed with.

It will be observed that the scale plate 29 is provided with indicating marks such as the letters F and S, indicating fast and slow, as a guide to the operator in setting the mechanism, to enable him to move the pointer 33 in the proper direction without test or experiment in the justifying of the mechanism. This provision also serves as a time saving element of the apparatus.

Changes within the spirit and scope may be resorted to as I have merely illustrated and described a single practical embodiment and since the invention is capable of variation in the details, combination and arrangement of the parts.

I claim as my invention:—

1. A gauge having an indicating mechanism provided with a dial and a cooperating indicator, justifying mechanism for the indicator within the gauge, said dial having an opening therethrough to permit access to the justifying mechanism for actuation, a shutter movable over and from said opening, said dial having an elongated slot therein, and an actuating means for the shutter extending through said slot and engageable with walls at opposite ends thereof to limit its movement in opposite directions.

2. A gauge having an indicating means, an actuating mechanism therefor including a driving member, justifying means movable on a line tangentially of a circle concentric with the indicating means including a plate, said plate having a calibrated portion, a slide on said plate having a laterally disposed pointer means cooperating with the calibrations thereof, said calibrated portion being offset from the slide to facilitate observation.

3. A gauge having an indicating means, an actuating means therefor including a driving member, a pivot rod for said driving member, a plate on said driving member through which said rod extends, said plate having a calibrated portion, a justifying slide having a laterally disposed pointer means disposed on and cooperating with the calibrations of said plate and having an elongated slot, said calibrated portion being offset from the slide to facilitate observation, said rod passing through said elongated slot, an adjustable securing member passing through said elongated slot, said calibrated plate and into said driving member to coact with said pivot rod in securing said plate to the driving member for unitary movement therewith, and said actuating means having direct connection to said slide.

4. A gauge having an indicating means, an expansion element of the split type, a lever pivoted to said element adjacent one end thereof, link means connecting said lever adjacent one of its ends and the other end of said element, a driving member for said indicating means, link means from the other end of said lever to said driving member, a justifying slide adjustably mounted on said driving member, and the last mentioned link means being directly connected to said slide intermediate the axis of the indicating means and the axis of the drive member.

In testimony whereof I affix my signature in presence of two witnesses.

JESSE W. WEISIGER.

Witnesses:
C. M. BLANKENSHIP,
L. L. SMITH.